United States Patent [19]
Steigerwald et al.

[11] 3,913,002
[45] Oct. 14, 1975

[54] POWER CIRCUITS FOR OBTAINING A HIGH POWER FACTOR ELECTRONICALLY

[75] Inventors: Robert L. Steigerwald, Scotia; John N. Park, Rexford, both of N.Y.

[73] Assignee: General Electric Company, Schenectady, N.Y.

[22] Filed: Jan. 2, 1974

[21] Appl. No.: 429,914

[52] U.S. Cl. ..................... 321/2; 315/208; 315/224; 315/247; 315/283; 321/18; 323/4; 323/24; 323/DIG. 1
[51] Int. Cl.² ................ H02M 3/335; H02M 5/257; H02M 7/155
[58] Field of Search ........ 315/200 R, 207, 208, 224, 315/247, 283, 307, DIG. 5, DIG. 7; 321/2, 9 A, 18, 45 R; 323/4, 17, 22 T, 22 SC, 24, DIG. 1

[56] References Cited
UNITED STATES PATENTS

| | | | |
|---|---|---|---|
| 3,265,930 | 8/1966 | Powell | 323/DIG. 1 |
| 3,310,730 | 3/1967 | Ruch | 321/18 |
| 3,377,546 | 4/1968 | Schott | 323/DIG. 1 |
| 3,518,527 | 6/1970 | Russell | 323/DIG. 1 |
| 3,581,187 | 5/1971 | Grady | 323/17 |
| 3,621,372 | 11/1971 | Paine et al. | 323/DIG. 1 |
| 3,648,150 | 3/1972 | Kernick et al. | 321/45 R |
| 3,697,856 | 10/1972 | Huang | 323/17 X |
| 3,743,887 | 7/1973 | Keough et al. | 323/24 X |
| 3,745,443 | 7/1973 | Weil | 323/17 X |

*Primary Examiner*—A. D. Pellinen
*Attorney, Agent, or Firm*—Donald R. Campbell; Joseph T. Cohen; Jerome C. Squillaro

[57] ABSTRACT

Solid state chopper circuits for alternating-current or direct-current loads use only high frequency filtering and electronically shape the line current to obtain a high power factor. The control circuit generates a reference signal which is shaped according to a selected control function and also determines the input power. By comparing a sensed instantaneous power current with the reference signal, as by using a comparator with hysteresis, a solid state switch in the chopper circuit is operated at a high frequency chopping rate to shape the power current and therefore the line current. An application is a ballast for a gaseous discharge lamp. The preferred circuit is a single phase transistor or gate turn-off thyristor d-c chopper fed by rectified unfiltered line voltage with a forced load current wave-shape for high power factor and good regulation.

6 Claims, 14 Drawing Figures

*Fig. 6* CONSTANT DC REFERENCE SIGNAL – BACK EMF LOAD

*Fig. 7* SINE SQUARED REFERENCE SIGNAL – BACK EMF LOAD

POWER CIRCUITS FOR OBTAINING A HIGH POWER FACTOR ELECTRONICALLY

BACKGROUND OF THE INVENTION

This invention relates to chopper circuits and other single phase power circuits for obtaining a high power factor electronically, and to a method for controlling such circuits. As a typical application, the invention further relates to an electronic ballast for gaseous discharge lamps in which high power factor is obtained by shaping the current drawn from the line.

Power factor correction in single phase circuits is commonly achieved by the use of relatively large power factor correcting capacitors or other power factor correcting devices. In addition to the expense, correction capacitors are sometimes not fully satisfactory because the power factor changes with varying load. It is more desirable to have the power factor remain high and relatively constant for varying loads. Moreover, it is desirable not to create current harmonics since they must be considered when determining power factor and their effect is to reduce power factor. In this regard, it is difficult to correct the power factor using capacitors when the main contributor to low power factor is the harmonic current content. As another correction technique, controlled rectifiers have been force-commutated to essentially move the fundamental component of line current in phase with the line voltage. While there is an improvement in power factor, it is somewhat limited due to the generation of line current harmonics which serve to decrease the power factor. In connection with a discussion of the prior art, it can be mentioned that in polyphase systems phase multiplication techniques can be used (e.g., 6 phase, 12 phase, etc.) to obtain better line current waveshape. However, this cannot be accomplished in single phase circuitry unless bulky fundamental frequency components are used to achieve the phase shift.

The present invention is directed to obtaining a high power factor, preferably 90 percent or greater, for both direct current and alternating current loads by employing solid state power circuits that operate to effectively waveshape the current drawn from the line. Although useful for a variety of loads including induction heating and single phase motor drives, the new converters are especially advantageous as an electronic ballast for mercury and other gaseous discharge lamps. The conventional ballast circuit includes an inductive choke to limit the current and a power factor correcting capacitor. However, the all-solid state ballast here described uses neither of these and has other desirable features.

SUMMARY OF THE INVENTION

A solid state chopper circuit or other single phase power circuit for obtaining a high power factor electronically is energized by low frequency alternating-current line voltage which may or may not be full wave rectified, depending on the load and the application, and in either case uses only a small high frequency filter. Such chopper circuits broadly include a controlled switching means, preferably a power transistor or gate turn-off thyristor, and a coasting device means, such as a power diode or in some cases a silicon controlled rectifier, that are conductive alternately and supply load current through a coasting inductor to the load. In accordance with the invention, control means are provided for operating the controlled switching means at a high frequency chopping rate to effect shaping of the line current as determined by a preselected reference signal, to thereby obtain a high power factor. To implement the control technique, a sensing device is coupled to sense a selected instantaneous power circuit current, usually the load current, and derives a sensor signal indicative thereof. The generated reference signal is in phase with the line voltage and, as employed in the usual circuit configurations, has a waveshape selected to shape the load or power current and therefore the line current for good power factor. In the control circuit here disclosed, a transformer energized from the line voltage derives a control voltage, and a control function generator modulates the control voltage in accordance with one or more predetermined control functions to obtain the desired reference signal waveshape. The sensor and reference signals are then compared to generate an output signal which is utilized to determine the intervals of conduction and nonconduction of the controlled switching means. Preferably, reference signal control band limits, closely adjacent to and conforming with the reference signal, are generated such as by employing a comparator with hysteresis, and the sensor signal is compared with the control band limits. The comparator output signal actuates the generation of turn-on and turn-off signals for the power transistor or GTO device.

Several embodiments for a-c and d-c loads are described, in which, for example, a pair of inverse-parallel GTO devices or SCR's are used for bidirectional conducting capability, or in which the GTO devices and coasting devices are used in a dual capacity as rectifier components. A method for controlling these new circuits is in accordance with the foregoing discussion.

A typical application is a solid state ballast for mercury lamps and other gaseous discharge lamps. The particular ballast circuit illustrated is a transistor chopper fed by high frequency filtered, full wave rectified 60 Hz voltage. The full wave rectified control voltage is modulated by a control function generator which produces a flattened sinusoidal reference signal with an electronically variable gain for good current and power regulation. The comparator with a feedback network for hysteresis produces an output signal which alternately actuates a positive and negative base drive network for turning on and turning off the power transistor at a variable chopping rate. Thus, the load current waveshape is determined by the reference signal waveshape. Large, expensive low frequency inductors and power factor correcting capacitors are therefore not used in the new electronic ballast.

DESCRIPTION OF THE PREFERRED EMBODIMENTS

Figure 1:
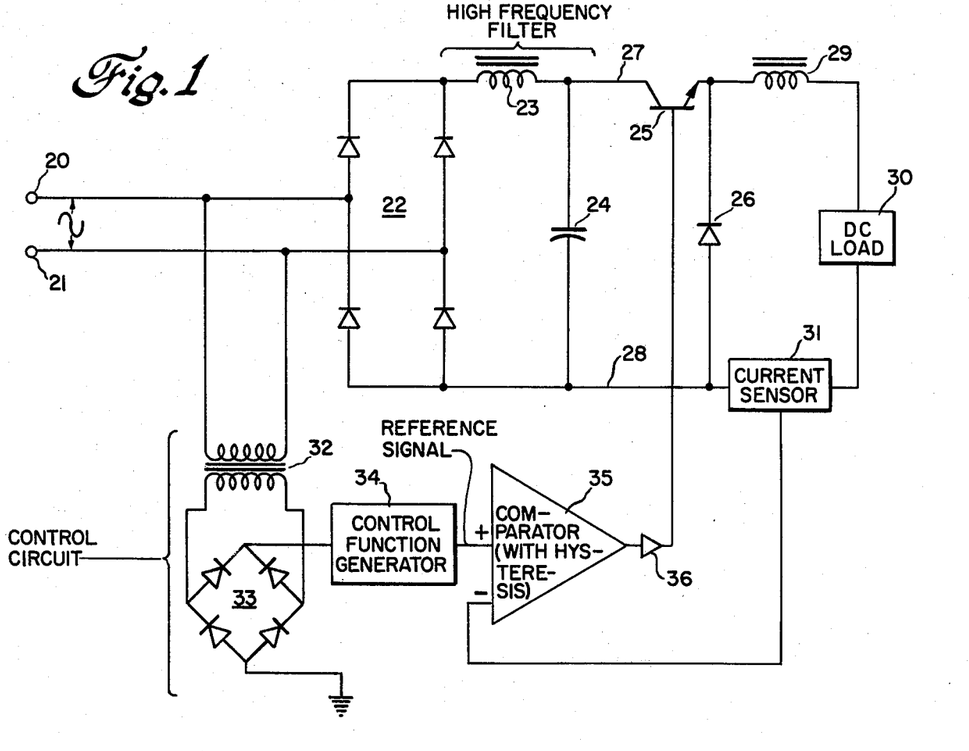
FIG. 1 is a schematic circuit diagram partly in block diagram form of a direct current chopper circuit constructed in accordance with the invention which includes a control circuit for current waveshaping to obtain a high power factor.

The high frequency, single phase chopper circuit shown in FIG. 1 supplies a controlled current waveshape and controlled power to a d-c load, and the line current is accordingly electronically shaped to obtain a high power factor. The power circuit is relatively simple and economical, preferably operates from unfiltered rectified line voltage, and uses no bulky supply frequency transformers or large energy storage or power factor correcting capacitors. The control circuit operates on the basis of continuously comparing the sensed load current with a preselected reference signal wave-shape to thereby determine the high frequency switching rate of the power transistor and generate the desired load current waveshape.

The single phase power circuit has a pair of input terminals 20 and 21 connected, by way of illustration, to a 60 Hz, 120 volt source of alternating current, but other power frequencies and voltages can be used depending on the application. A diode bridge rectifier 22 connected to the a-c input terminals produces a full wave rectified sinusoidal voltage which is supplied essentially unfiltered to the chopper circuit. A high frequency filter provided for example by a series inductor 23 and a shunt capacitor 24 is connected across the output terminals of the bridge rectifier 22, but these high frequency filter components essentially are provided to isolate the high frequency chopping from the 60 Hz line. It may be preferable to further include a second shunt filter capacitor connected between the input lines, and other variations are possible depending upon the amount of line filtering required. In the chopper circuit, a power transistor 25 and power coasting diode 26 are connected in series between the high voltage, 120 Hz d-c supply terminals 27 and 28, and a coasting inductor 29 is connected in series with the d-c load 30 across the coasting diode 26. A suitable load current sensor 31, such as a small current transformer or sensing resistor, is coupled in series with d-c load 30 and continuously supplies an input signal to the control circuit which is indicative of the magnitude of the instantaneous load current. In operation, in the same manner as a time ratio control circuit, the power transistor 25 is turned on and off at a high frequency switching rate. During conducting intervals of the transistor 25 power is supplied to the load 30 through the coasting inductor 29, and during non-conducting intervals of the transistor 25 the coasting diode 26 becomes forward biased and provides a path for load current as the stored energy in coasting inductor 29 discharges. The circuit is preferably operated in the tens of kilocycle frequency range, for example between 10 and 40 kHz for some applications. With this power circuit configuration, it is noted, there is inherently a small high frequency ripple in the load current.

Figure 2:
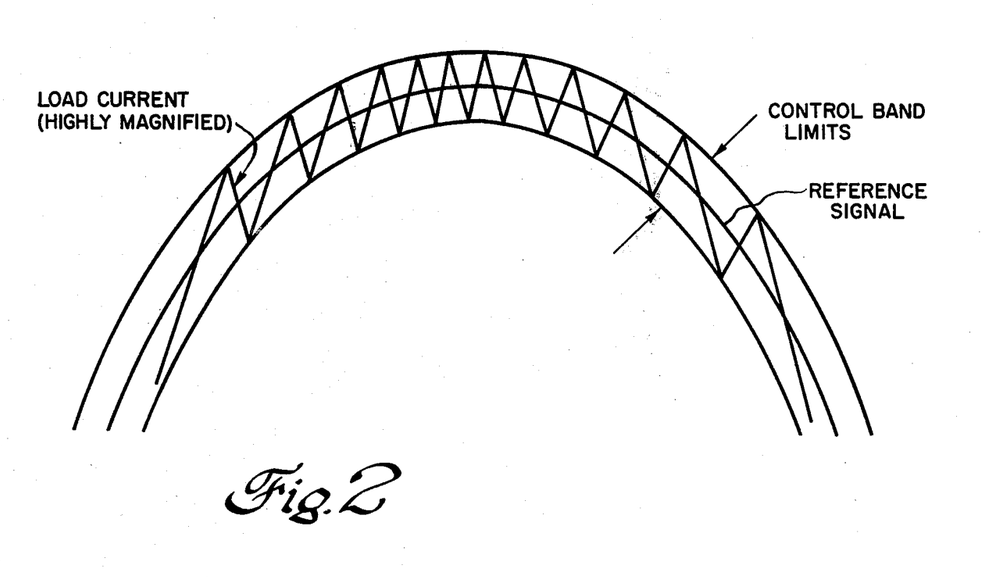
FIG. 2 is a waveform diagram illustrating a typical sinusoidal reference signal and a control band with closely adjacent limits for controlling the intervals of conduction and nonconduction of the power transistor in FIG. 1.

The control circuit generates a reference signal which is basically in phase with the applied line voltage and has a predetermined waveshape and magnitude to achieve high power factor and deliver a selected amount of power to the load. As has been pointed out, in this power circuit the reference signal determines the load current waveshape and thus the line current waveshape and input power. The reference signal waveshape can also be selected to achieve additional desirable features such as good regulation and suitable load current waveshapes to meet the range of load operating conditions. Accordingly, the exact reference single waveshape that is selected depends upon the combination of features that are required or the best compromise, depending upon the particular circumstances. In order to eliminate the need for special signal generating equipment such as low frequency oscillators and waveform generators, it is preferable to derive a control signal directly from the a-c input lines and shape it according to a selected control function to obtain the desired reference signal waveshape. The reference signal is then also in phase with the line voltage. To this end, a step-down transformer 32 is connected across the input lines and, for this power circuit configuration, feeds a diode bridge rectifier 33 so that the input to a control function generator 34 is a full wave rectified d-c voltage. The control function is selected as previously described and can be a constant gain, an electronically variable gain, a squaring circuit, a square root circuit, etc., depending upon the type of load and control desired. Referring also to FIG. 2, there are closely adjacent control band limits associated with the reference signal that effectively determine the limits of excursion of the load current as shaped by the controlled switching action of the power transistor 25. The control band is effectively placed about the reference signal, or can be entirely at one side of the reference signal or closely spaced from it. In any case, the control band limits are close to or coincide with the reference signal and conform to its waveshape. Although other circuitry can be employed to obtain the control band or band limits, a simple and effective implementation is by the use of a comparator 35 with hysteresis. The hysteresis characteristic may be obtained by a feedback connection from the output to the positive input as is further explained with regard to FIG. 14. The reference signal is applied to the positive input of comparator 35, while the negative input is a sensor signal indicative of the instantaneous load current generated by the current sensor 31.

An output from the comparator 35 is amplified by amplifier 36 and is effective to apply a base drive signal to the power transistor 25 to render it conductive. Assuming that load current is circulating in the coasting path (through elements 26, 29, 30, 31) and is decreasing, and that there is no output from the comparator 35, the load current continues to decrease until the current sensor signal at the negative input of the comparator is equal to and about to go below the reference signal control band limit at the positive input of the comparator (i.e., the reference signal minus hysteresis). A comparator output is now produced, turning on the power transistor 25 and causing an increase in the load current as current is drawn from the supply. The reference signal now switches to its upper control band limit value (i.e., the reference signal plus hysteresis), and the comparator output remains high and the power transistor 25 remains conductive until the load current increases and the current sensor signal becomes equal to the value of the other reference signal control band limit. The comparator output goes low, thereby turning off the power transistor 25 and switching the value of the reference signal at the positive input of the comparator to its lower control band limit. The load current therefore has a small amount of ripple about the nominal value determined by the reference signal hysteresis. The chopping frequency of the circuit usually is not constant during each half cycle of the rectified sinusoidal voltage supplied to the chopper circuit. The chopping frequency is determined primarily by the value of the coasting inductor 29, the instantaneous voltage difference between the rectified sinusoidal voltage feeding the chopper and the actual load voltage, the storage time of power transistor 25, and the comparator hysteresis. For the circuit shown in FIG. 1, the chopping frequency is considerably higher at the middle of the half cycle than at either end where the supply voltage is low. This periodically variable chopping frequency is desirable for some loads, as for example to eliminate acoustic resonance problems in mercury vapor lamps which can occur under certain constant high frequency conditions.

FIGS. 3–7 show the pertinent power circuit waveforms for various combinations of reference signal waveshapes and loads, and illustrate graphically the effect of shaping the load current and the line current to obtain a high line power factor. The load is identified as either a resistive load or a back emf load which at least during a portion of a half cycle has an instantaneous load voltage greater than the applied voltage so that no power is transferred to the load during this portion of the half cycle. The line voltage in each case is an alternating a-c voltage, but the shaped load current and therefore also the line current depend on the control function and the nature of the load. The load current and the line current are not necessarily the same shape or magnitude, and this is explained by the fact that there is an impedance transformation by virtue of the chopper operation. To illustrate this further, in the case where the d-c supply voltage is 400 volts and the load voltage is 100 volts, it is seen that there is a voltage transformation, and in like manner there is also a current transformation. These waveforms do not show any high frequency ripple which is present to a certain extend depending on the values of the high frequency filter components. In analyzing the power factor obtained by the line voltage and electronically shaped line current, it should be realized that increased harmonic content in the line current has the effect of reducing the power factor, which is commonly defined as the ratio of the actual power to the apparent power.

Figure 3:
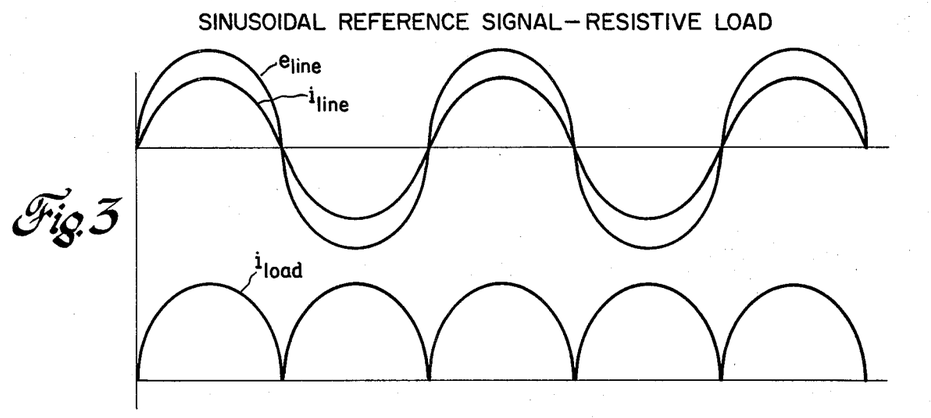
FIGS. 3–7 are waveform diagrams showing the line current and voltage, load current, and reference signal in some cases, for various combinations of loads and reference signal waveshapes.
Figure 4:
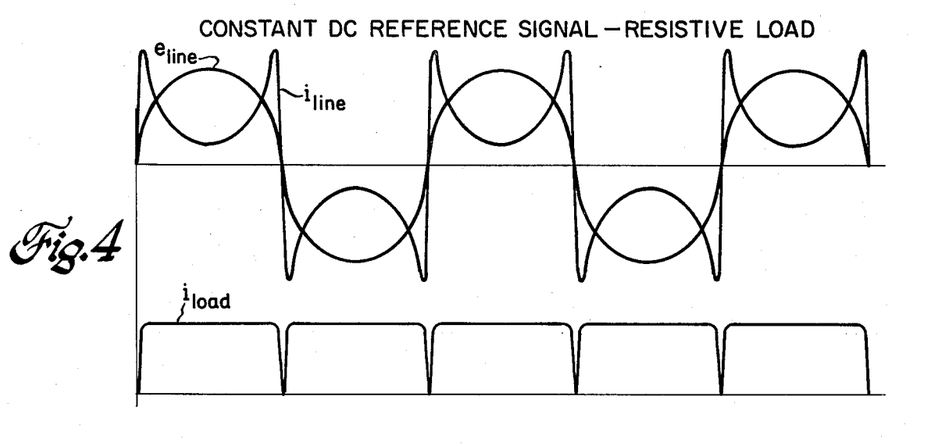
Figure 5:
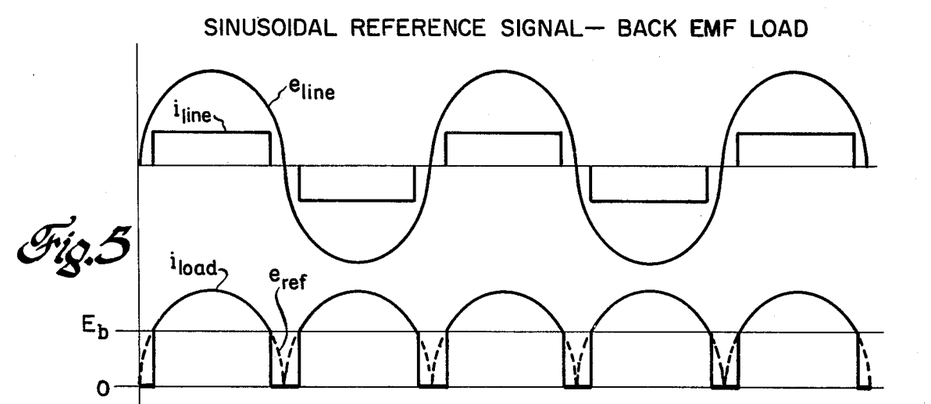
Figure 6:
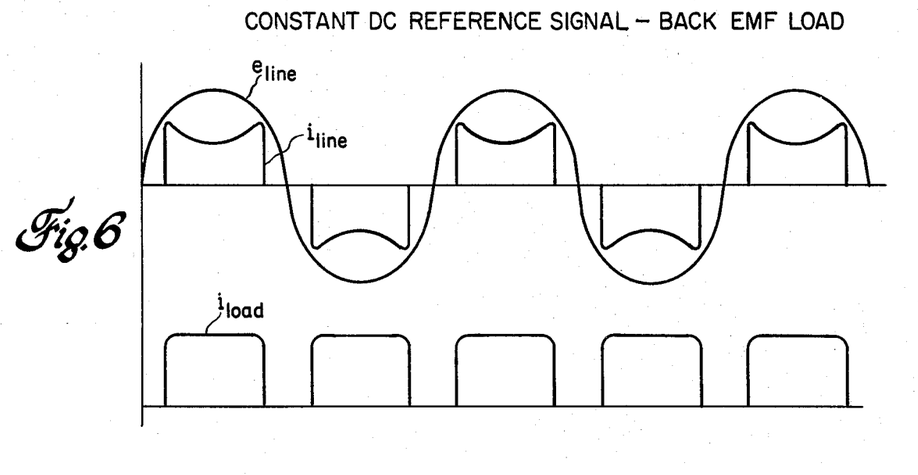
Figure 7:
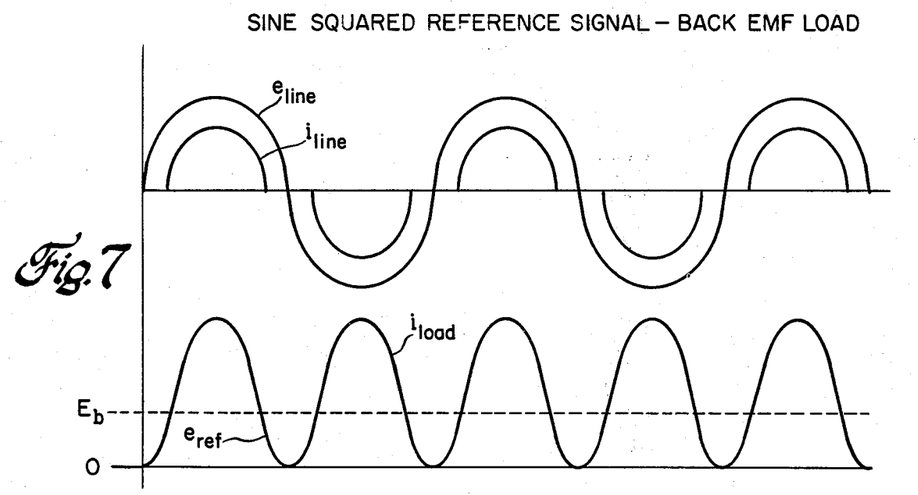

In FIG. 3, the simple case of a sinusoidal reference signal with a resistive load produces sinusoidal load and line currents that are in phase with the line voltage for high power factor. In FIG. 4, for the case of a constant d-c reference signal with a resistive load, the load current is constant except near the zero crossings of the line voltage, and the line current waveshape, although in phase with the line voltage, is not particularly desirable since there is considerable harmonic content due to the high current values in the region of the zero crossings. With a sinusoidal reference signal and a back emf load, as shown in FIG. 5, there can be no load current and therefore no line current at the beginning and end of each half cycle when the back emf $E_b$ exceeds the applied voltage (the load acts like a battery). In the intermediate portions of each half cycle, the load current follows the sinusoidal reference signal $e_{ref}$, and the line current is relatively constant and centered with respect to the line voltage for high power factor. The situation is similar in FIG. 6 for the case of a constant d-c reference signal with a back emf load, except that the relatively constant load current in the intermediate portion of each half cycle results in a non-uniform line current like that in FIG. 4 which has considerable harmonic content. In FIG. 7, the combination of a sine squared reference signal with a back emf load results in a more sharply peaked load current and line current than is shown in FIG. 3 and a power factor not quite as high.

Figure 8:
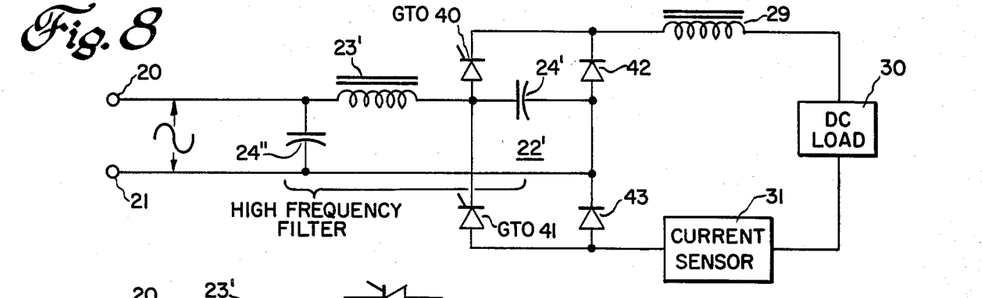
FIGS. 8 and 9 are schematic diagrams of other power circuit embodiments for d-c and a-c loads implemented with gate turn-off thyristors.

Additional embodiments of the new power circuit for obtaining a high power factor electronically will be discussed with regard to FIGS. 8–10, and others are possible. Although a variety of controlled power semiconductors or controlled switching means in addition to a power transistor can be used in the power circuit including the silicon controlled rectifier (SCR), the preferred power device is a solid state switch with at least one control electrode for turn-on and turn-off, such as a power transistor or a gate turn-off thyristor (GTO). The gate turn-off thyristor is also known as a gate controlled switch and is described for example in the General Electric SCR Manual, 5th Ed., copyright 1972, page 12. The circuit when suitably constructed can be used with both alternating-current and direct-current loads, and in either case the load can be a load circuit such as, for instance, a full bridge or half bridge inverter that is supplied by unidirectional voltage. Although the load current sensor 31 is preferably located in the coasting path of the chopper circuit in series with the load, and is useful to keep the current within the capabilities of the controlled solid state switch or switches, an alternative location in the power circuit is at the low frequency side of the high frequency filter. In the embodiment of FIG. 8 for a d-c load, the modification is made that the high frequency filter is connected between the input terminals and the bridge rectifier 22′, and is a $\pi$-type filter including a second shunt capacitor 24″ connected between the input lines, as well as the series inductor 23′ and shunt capacitor 24′. Another modification is that the full wave bridge rectifier 22′ includes a pair of GTO devices 40 and 41 that function as the high frequency chopper devices as well as rectifying elements. The power diodes 42 and 43 in rectifier 22′ function alternately as the coasting diodes in the chopper circuit. When input terminal 20 is positive, GTO 40 is switched at a high frequency rate while diode 43 conducts continuously and diode 42 acts as the coasting diode. When the line voltage reverses and input terminal 21 is positive, GTO 41 is operated at a high switching rate and diode 43 becomes the coasting diode. In most cases, snubbers are necessary across each gate turn-off thyristor to control the rate of rise of reapplied forward voltage. The reference signal is obtained in the same manner as FIG. 1 except that a line voltage polarity detector is necessary at an appropriate point in the control logic circuitry to gate a proper GTO device.

Figures 9, 10, 11:
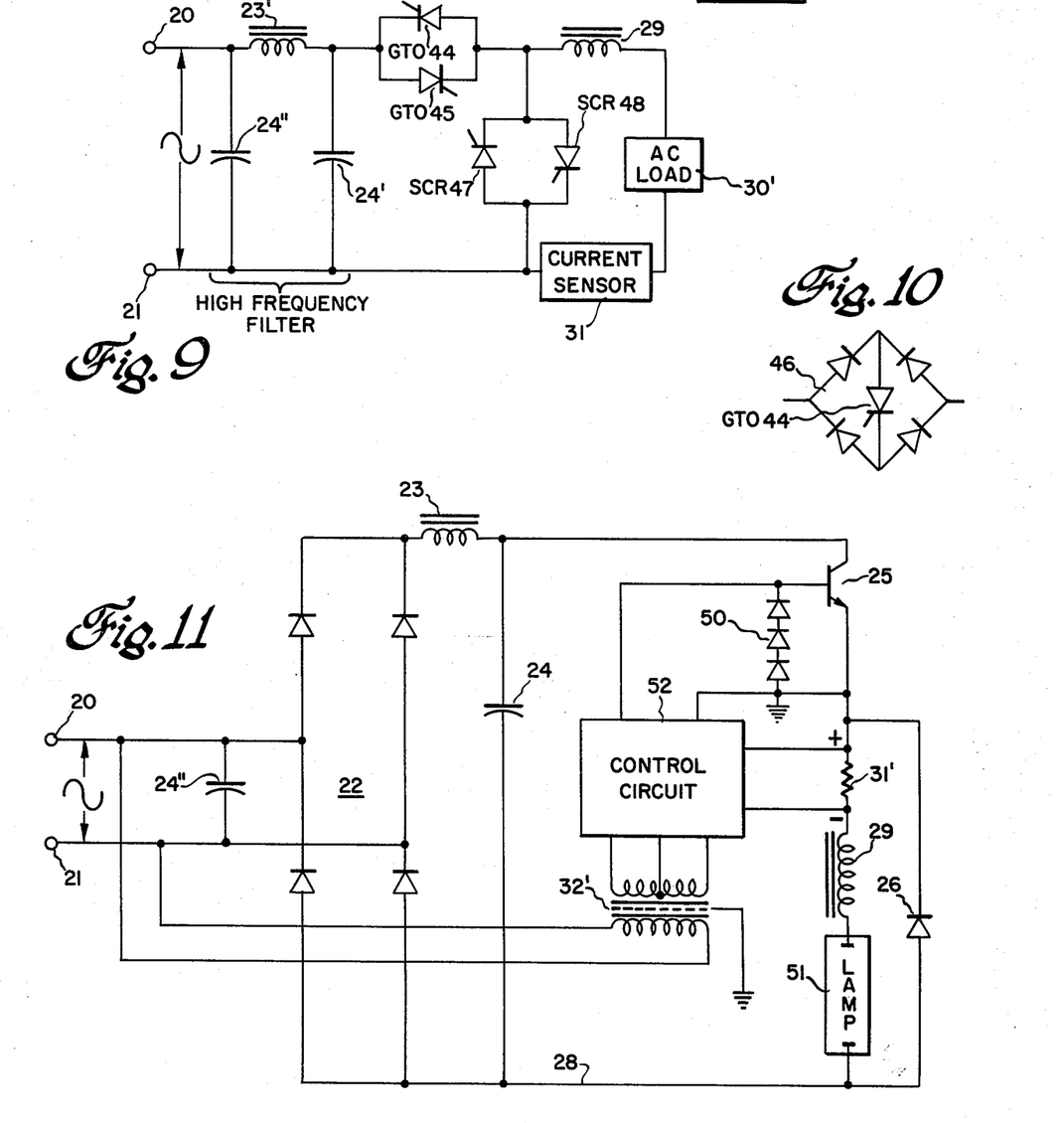
FIG. 10 is an alternative configuration for the inverse-parallel device arrangement of FIG. 9 which requires only one controlled power device.
FIG. 11 is a schematic power circuit diagram with control circuit connections according to a preferred embodiment of the invention for a solid state mercury lamp ballast.

The embodiment of FIG. 9 is suitable for an a-c load 30' or a-c load circuit. The high frequency filter is connected between the input lines, and while the chopper circuit is similar to FIG. 1, the high frequency switched, controlled power device or devices has bidirectional conducting capability, as does the coasting power device or devices. As illustrated, a pair of inverse-parallel connected GTO devices 44 and 45 are provided, and are gated at high frequency in accordance with the line polarity. In the coasting path, a pair of inverse-parallel connected SCRs 47 and 48 is suitable since commutation is provided when a GTO is gated because the voltage on capacitor 24' is applied to the conducting SCR in the reverse bias direction. FIG. 10 shows an alternative arrangement requiring only the one GTO device 44 which is connected in a full wave diode bridge 46 for conduction for both polarities of the applied line voltage. Since the operation of the power circuit for a-c loads is similar to that for d-c loads, no further detailed description is believed to be necessary, it being understood that with terminal 20 positive, GTO 45 and SCR 47 operate alternately, while with terminal 21 positive GTO 44 and SCR 48 operate alternately, the gating signals in each case being coordinated.

High frequency chopper circuits with an electronically obtained high power factor in accordance with the foregoing teachings have a variety of applications. In addition to an electronic ballast for a gaseous discharge lamp, these new circuits are useful in induction heating applications where high power factor and the absence of electrolytic capacitors is desired. Most induction heating type applications can allow the input voltage to drop to near zero during the valleys of the 60 Hz line voltage or 120 Hz rectified wave as here described. The invention is also advantageous in single phase motor drives where high power factor with good waveshape is desirable. Other applications include power supplies and battery chargers. FIGS. 11–14 disclose the preferred embodiment of the invention for a solid state mercury lamp ballast. For more detailed information on an electronic ballast and an improved circuit, reference may be made to the concurrently filed application Ser. No. 430,088 by the present inventors jointly with Steven C. Peak. The power circuit shown in FIG. 11 is a direct current chopper of the type illustrated in FIG. 1 which uses a high frequency power transistor and supplies unidirectional voltage to the load. High efficiency and a high power factor circuit have obvious economic advantages. Other desirable features for this application are low acoustic noise, low radio frequency interference noise and negligible electrical interference to the surroundings, good regulation, and the ability to operate over an ambient temperature range of −30°C to +85°C. The power circuit preferably is suitable for fabrication by power module techniques, while the control circuit is fabricated using integrated circuit and microelectronic techniques. The particular circuit being described is energized by a 60 Hz, 277 volt, single phase source and the lamp is a 250 watt mercury lamp, but other supply voltages and gaseous discharge lamps can be used. By comparison with FIG. 1, the high frequency filter further includes a shunt capacitor 24" connected between the input lines for additional filtering. Thus, the voltage feeding the chopper is essentially an unfiltered full wave rectified 60 Hz line voltage.

The power transistor 25 for instance is a Toshiba 2SC1172A transistor with a diode string 50 connected between base and emitter to clamp the base-emitter voltage to a value below the avalanche voltage. The current sensor is a small sensing resistor 31', by way of illustration a ½ ohm resistor, connected in series with the coasting inductor 29 and mercury lamp 51. The coasting diode 26 is connected across these elements. The voltage across the sensing resistor 31' is supplied to the control circuit 52 and is indicative of the instantaneous load current. This is a negative-going signal voltage in this circuit arrangement, taking the emitter of transistor 25 as reference potential or ground. A step-down transformer 32' connected across the line supplies power to the control circuit 52 and also provides a control signal that is modified by the selected control function to provide the reference signal. The transformer 32' has a center-tapped secondary winding to facilitate the generation of a negative reference signal to be compared with the negative-going sensing resistor signal voltage. In connection with the power transistor 25, it also facilitates the use of a positive base drive network to supply current for turn-on, and a negative base drive network to extract base current and provide positive turn-off. At these power levels dual base drive circuitry of this type is needed. The base drive current and voltage supplied by control circuit 52 to power transistor 25 provide the proper conditions for chopper operation with a full wave rectified voltage. As will be further explained, the base current is proportional to the collector current in the power transistor, and electrolytic capacitors are not needed in the base drive circuitry. It is noted that the transformer 32' has a low rfi coupling effected by shielding the primary and secondary windings.

Figure 12:
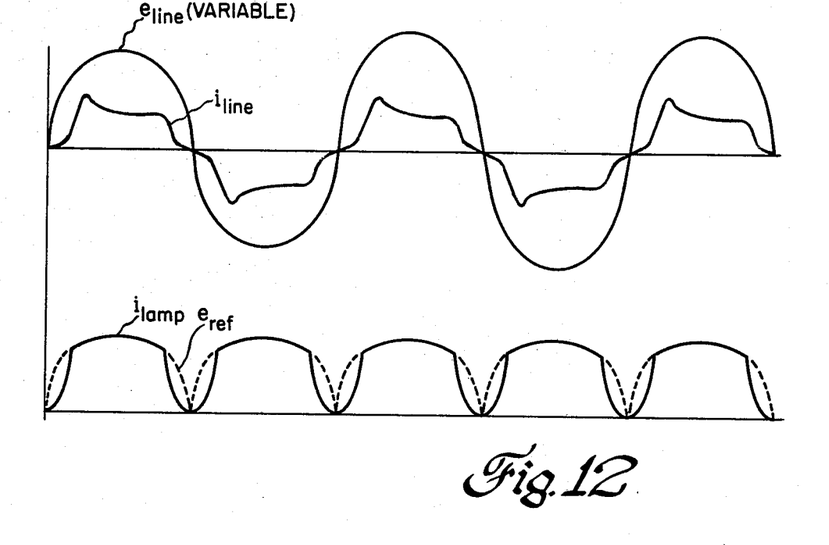
FIG. 12 shows ideal waveform diagrams for the line current and voltage, load current, and reference signal for the mercury lamp ballast circuit.
Figure 13:
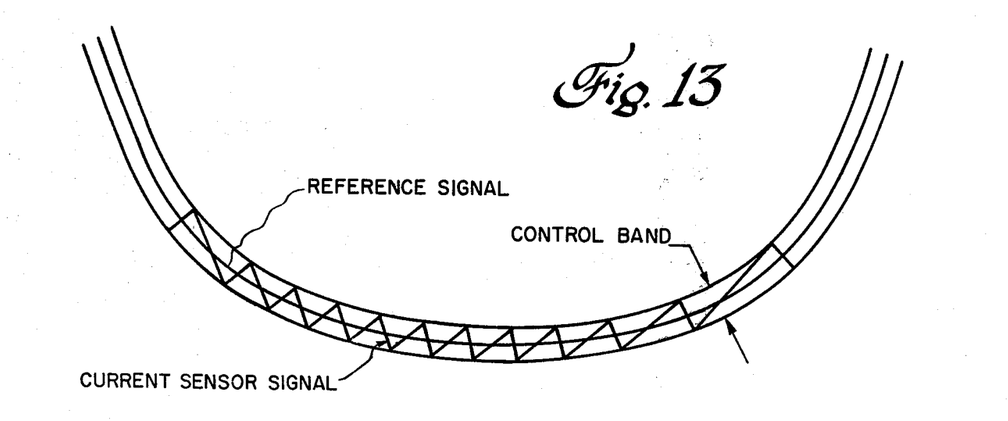
FIG. 13 is an enlarged diagram of the flattened sinusoidal reference signal and control band limits for the control circuit current sensor signal.

Referring to the waveforms of FIG. 12, it is realized in practice that the line voltage varies under normal conditions. The reference signal $e_{ref}$ is a full wave rectified, flattened sinusoidal signal, and the control function additionally has an electronically variable gain characteristic so that the lamp current remains constant despite line voltage variations. This provides good lamp current regulation for a reasonable range of line voltage variations. A mercury lamp load is a non-linear load with a negative resistance characteristic at relatively low frequencies (e.g. 60 or 120Hz) and further has some of the characteristics of a back emf load as previously discussed. There is some lamp current at the beginning of each half cycle before ignition and at the end of each half cycle when the line voltage is low, as illustrated, and in the intermediate portion the lamp current is forced to follow the flattened sinusoidal reference signal. The shaped line current can be described as being roughly constant in the intermediate portion of the half cycle. This line current waveshape provides high power factor, easily in excess of 90 percent, with good regulation of the lamp power and input power. The flattened sinusoidal reference signal is actually negative-going as shown in FIG. 13.

Figure 14:
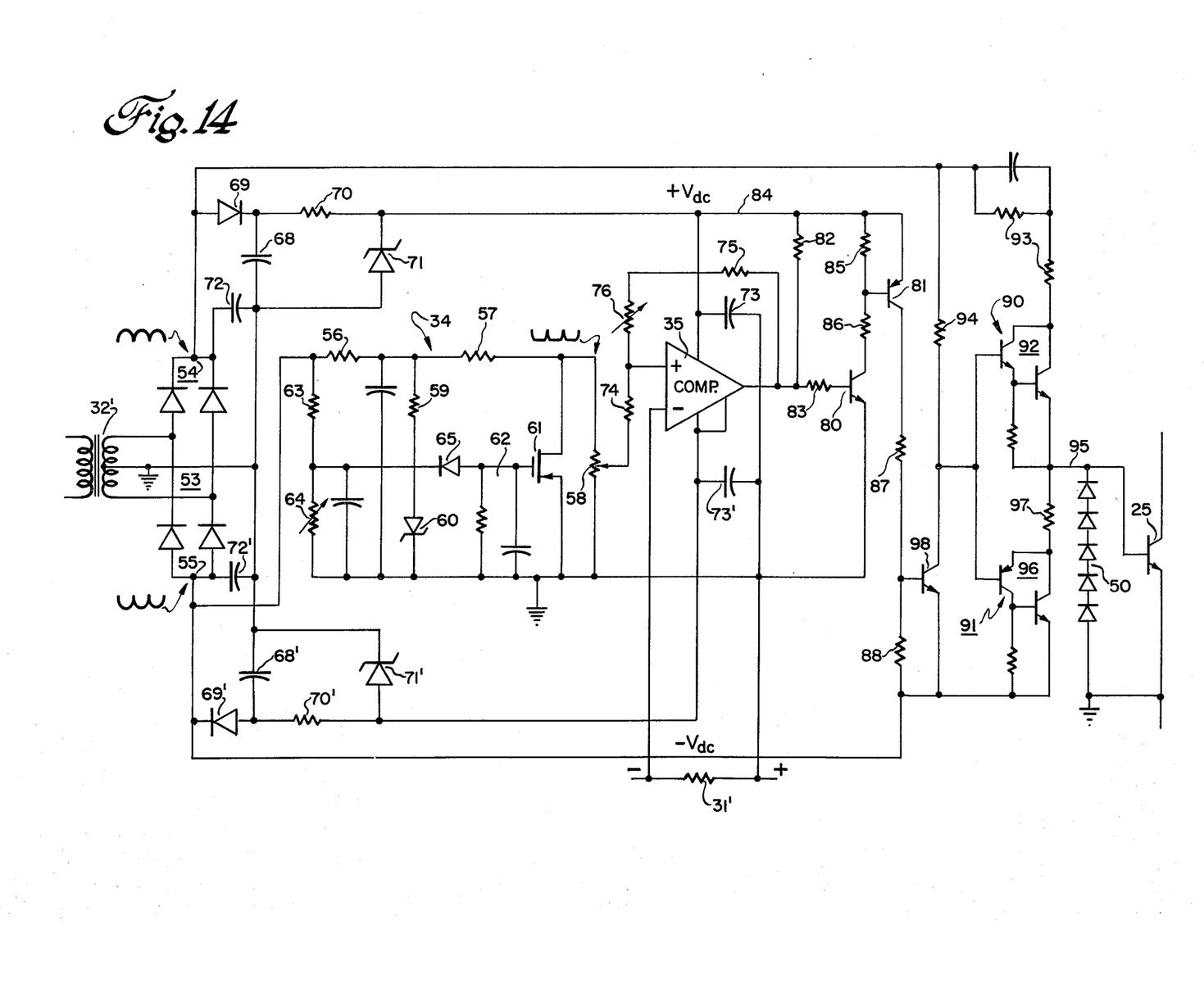
FIG. 14 is a detailed control circuit diagram for the mercury lamp ballast.

FIG. 14 is a detailed circuit diagram of the control circuit 52. The center-tapped secondary winding of transformer 32' is connected to a full wave diode bridge rectifier 53 and generates a positive-going rectified sinusoidal voltage at one output junction 54 and a negative-going rectified sinusoidal voltage at the other output junction 55. This negative rectified sinusoidal voltage, having for example a peak value of 10 volts, is fed to the control function generator 34 which produces the flattened sinusoidal, automatic gain controlled reference signal. In particular, the control function generator 34 is comprised by a resistive voltage divider connected between the junction 55 and a reference or ground bus which includes a pair of resistors 56 and 57 and a potentiometer 58. The generated reference signal is taken at the pointer of potentiometer 58 and supplied to the positive input of comparator 35. Flattening of the sinusoidal control signal is accomplished by a small resistor 59 and a small Zener diode 60 connected in series between the junction of resistors 56 and 57 and the ground bus. A small amount of current is diverted through this network. The automatic gain control feature is obtained by means of a MOS or insulated-gate field effect transistor (FET) 61 which is connected across the potentiometer 58 and acts as a variable resistor. The peak voltage of the sinusoidal control voltage is detected by a peak detector circuit 62 which determines the gate voltage of the field effect transistor 61. To this end, a pair of series resistors 63 and 64 are effectively connected between the rectifier terminal 55 and the ground bus, and the voltage at the junction of this voltage divider is supplied through a blocking diode 65 to the peak detector 62, which is comprised by a large resistor and a capacitor connected in parallel between the gate of FET 61 and ground. Diode 65 prevents rapid discharge of the capacitors. The other capacitors shown in this sub-circuit are high frequency filter components. In operation, peak detector 62 changes the gate voltage, and therefore the value of the shunt resistance in the voltage divider so that the reference voltage at the tap of potentiometer 58 is constant despite variations in the peak value of the control voltage due to line voltage variations.

The comparator 35 is preferably an integrated circuit component such as an LM311 device manufactured by the National Semiconductor Corporation. A positive low voltage power supply and a negative low voltage power supply are provided to produce the respective voltages $+V_{dc}$ and $-V_{dc}$ for supplying power to the comparator. The positive low voltage power supply is comprised by a filter capacitor 68 and a blocking diode 69 connected in series between the grounded center-tap of transformer 32' and the positive output junction 54 of bridge rectifier 53, and a small resistor 70 and a Zener diode 71 connected in series across the filter capacitor. The regulated voltage at the cathode of Zener diode 71 is typically about +5 volts. The low voltage negative power supply at the other side of bridge rectifier 53 is similar with corresponding components designated by corresponding primed numerals. In addition, small high frequency filter capacitors 72 and 72' are connected between the respective bridge output junctions 54 and 55 and ground to filter undesirable high frequency transients in the full wave rectified voltages. Capacitors 73 and 73' provide local high frequency filtering for the power supply driving comparator 35 to insure noise-free operation of the comparator.

The minus terminal of sensing resistor 31', as previously mentioned, is connected directly to the negative input of comparator 35. The positive input is coupled through resistor 74 to the tap of potentiometer 58. To provide the comparator hysteresis characteristic, a relatively large resistor 75 and a relatively large variable resistor 76 are connected in series in a feedback path between the output and the positive input, and function with resistor 74 as a voltage divider. The amount of feedback voltage or feedback current at the positive input has two values depending upon whether the comparator output is high or low. The net instantaneous voltage at the positive input is thus determined by the instantaneous value of the negative-going flattened sinusoidal reference signal at the tap of potentiometer 58 and by the amount of feedback voltage. As a result of the normal operation of the chopper circuit as previously explained, the changing current sensor signal at the negative input of the comparator is alternately compared with the two reference signal control band limits. This will be reviewed again later.

The output of comparator 35, which typically has a low output of −5 volts and a high output of +5 volts, is coupled to a pair of transistors 80 and 81 that provide the interface between the comparator circuit and the power transistor base drive circuit. In particular, the comparator output is coupled to the junction of a pair of resistors 82 and 83 connected in series between the positive low voltage bus 84 and the base of NPN transistor 80, the emitter being connected to ground. Upon the appearance of a high comparator output, transistor 80 is rendered conductive and initiates current through a pair of resistors 85 and 86 connected between the bus 84 and its collector, thereby also turning on the PNP transistor 81. The base and emitter of transistor 81 are connected across the resistor 85, while its collector is effectively connected through resistors 87 and 88 to the negative output terminal 55 of the bridge rectifier 53.

The power transistor base drive circuit is divided into alternately operating positive and negative base drive circuits 90 and 91 that serve to turn on and positively turn off the power transistor 25. The magnitude of the positive base current varies as a half sinusoid since only high frequency filtering is provided (capacitor 72) and therefore the collector current in power transistor 25 is proportional to the base current in transistor 25, thereby obtaining high efficiency. The peak current provided by the bridge rectifier in this circuit is about one ampere. In the positive base drive circuit 90, the collectors of a pair of transistors in a Darlington amplifier 92 are connected through two small resistors 93, one having a small shunt capacitor, to the positive bridge output terminal 54. The base of the first transistor is coupled through a biasing resistor 94 to the terminal 54, while the emitter of the Darlington amplifier is coupled to the base electrode 95 of the power transistor. With this arrangement, the Darlington amplifier 92 is normally conducting, and supplies base drive current to the base electrode 95. The negative base drive circuit includes a second Darlington amplifier 96 comprised by a pair of opposite type transistors whose emitter and collector are respectively connected together and coupled through a small resistor 97 to the base electrode 95. The other collector and the other emitter are coupled to the negative output bridge terminal 55. In order to operate the positive and negative base drive circuits alternately, an additional NPN transistor 98 is provided, having its base connected to the junction of resistors 87 and 88, its emitter connected to the negative supply terminal 55, and its collector connected to the base electrode of both first transistors in the two Darlington amplifiers 92 and 96. With this arrangement, a positive output from comparator 35 turns on transistors 80 and 81, which in turn renders conductive the transistor 98, thereby turning off the Darlington amplifier 92 and also turning on the Darlington amplifier 96. Excitation of the negative base drive circuit 91, of course, renders nonconductive the power transistor 25.

The operation of the solid state mercury lamp ballast will be reviewed only briefly with reference to FIGS. 11–14. Since only high frequency filtering of the line voltage is provided in the power circuit, the supply to the transistor chopper circuit is essentially a full wave rectified, 120 Hz sinusoidal voltage. The line voltage is also supplied by means of stepdown transformer 32' to the control circuit 52. In the control circuit (FIG. 14), the negative full wave rectified, low sinusoidal voltage at the output of bridge rectifier 53 is used as a control voltage for the control function generator 34. In this sub-circuit, a voltage divider comprised by resistors 56 and 57 and potentiometer 58 has a variable resistance component provided by FET 61. The automatic gain control feature is obtained since the gate voltage as determined by the peak detector 62 is equal to the peak of the rectified control voltage. When the magnitude of this voltage drops, FET 61 tends to turn off and increases the variable resistance in the voltage divider so that the reference signal at the tap of potentiometer 58 remains approximately constant with line voltage variations. The sinusoidal control voltage is further flattened somewhat by means of a small current drain through the resistor 59 and Zener diode 60. The regulated, flattened sinusoidal reference signal supplied to the positive input of comparator 35 results in good load current regulation and a slight reduction in the peak current which the power transistor conducts (compared to the unflattened sinusoidal case).

Upon energizing the ballast, the positive base drive circuit 90 automatically conducts and supplies base current to the power transistor 25, turning it on. In the steady state, the base current of the power transistor 25 is at all times proportional to the collector current, which varies as a half sinusoid. The build-up in load current is sensed by the sensing resistor 31', and supplied as a negative-going signal to the negative input of comparator 35. Assuming that the line voltage is high enough to cause ignition of the mercury lamp (see FIG. 12), the lamp current is thereafter shaped in accordance with the flattened sinusoidal reference voltage until near the end of the half cycle in the valley region. It will be recalled that the comparator 35 has a hysteresis characteristic and that there is a polarity inversion since the reference signal is negative-going while the lamp current is positive. Assuming that power transistor 25 is conducting and the lamp current is increasing, with a low output from comparator 35, the load current increases until the current sensor signal is equal to the reference signal control band limit corresponding to maximum current (FIG. 13). The comparator 35 now produces a high output, turning on transistors 80, 81, and 98, thereby causing the negative base drive circuit 91 to conduct while simultaneously turning off the positive base drive circuit 90. Power transistor 25 is now nonconductive, and load current now circulates through the coasting path provided by the forward biased power diode 26 and begins to decrease. In the meantime the amount of feedback voltage from the output of comparator 35 to the positive input has changed, thereby switching the basis for comparison to the other reference signal control band limit corresponding to the minimum current value. When the decreasing current sensor signal becomes equal to the other control band limit, the output of comparator 35 goes low, thereby turning off transistors 80, 81, and 98, and rendering conductive the positive base drive circuit 90 while turning off the negative base drive circuit 91. Primarily because the rate of rise of load current is variable since it is determined primarily by the difference between the instantaneous sinusoidal supply voltage and the lamp voltage, the switching frequency of power transistor 25 automatically varies from approximately 10 kHz to 30 kHz and back to 10 kHz over a complete half cycle. In a mercury lamp ballast, this sweeping of frequency helps eliminate acoustic resonance problems.

By shaping and forcing the lamp current to a flattened sinusoidal waveshape as shown in FIG. 12, the line current is in phase with the line voltage and is electronically shaped to obtain a high power factor exceeding 90 percent. By properly selecting the magnitude of the reference signal and using a control function to obtain an electronically variable gain, lamp power is regulated for a nominal line voltage of 277 volts to less than ½ percent for a plus or minus 10 percent line voltage variation. The high frequency ripple in the lamp current is not shown, but for this circuit has approximately 0.25 ampere ripple about the nominal value. The actual amount of ripple can be varied by adjusting the resistor 76 in the feedback network of comparator 35. The amount of current and hence power delivered to the load can be varied by adjusting resistor 58, which effectively varies the magnitude of the reference signal. Although discussed with regard to single phase choppers, the same techniques are applicable to polyphase power circuits.

In summary, solid state power circuits for alternating-current and direct-current loads use only high frequency filtering and electronically shape the current drawn from the line to obtain a high power factor. The generated reference signal waveshape not only determines the load or other power current waveshape, but also sets the input power level and can be used for additional functions such as good regulation. The chopper circuit can be constructed in both alternating-current and direct-current embodiments preferably using power transistors or gate turn-off thyristors as the controlled switching devices. Typical applications are the solid state ballast for a gaseous discharge lamp, and also induction heating and single phase motor drives.

While the invention has been particularly shown and described with reference to several preferred embodiments thereof, it will be understood by those skilled in the art that the foregoing and other changes in form and details may be made therein without departing from the spirit and scope of the invention.

The invention claimed is:

1. A circuit for obtaining a high power factor electronically comprising
   a single phase solid state chopper circuit for energization by low frequency alternating-current sinusoidal line voltage and electronically shaped line current and comprising high frequency filter means for supplying sinusoidal voltage to a pair of supply terminals, and further comprising controlled switching means and coasting device means effectively coupled to said supply terminals and to coasting inductor means and operated to be conductive alternately to supply load current through said coasting inductor means to a load, current sensor means coupled to sense the instantaneous load current and produce a sensor signal indicative thereof, and a control circuit including generating means for generating a reference signal in phase with the line voltage and having a preselected waveshape and magnitude to determine the power level and to effect shaping of the line current by means of shaping the load current to obtain a high line power factor exceeding 90 percent, comparing means for instantaneously comparing said sensor and reference signals and producing an output signal, and circuit means actuated by said output signal for operating said controlled switching means at a variable high frequency chopping rate to force and shape the line current as the result of forcing and shaping the load current as determined by the preselected reference signal waveshape.

2. A circuit according to claim 1 wherein said generating means in said control circuit comprises means for deriving a sinusoidal control voltage in phase with the line voltage, and control function generator means for selectively varying the magnitude and waveshape of said sinusoidal control voltage according to a predetermined control function to derive the preselected reference signal waveshape, and said comparing means is comprised by a comparator circuit with hysteresis which derives a pair of control band limits closely adjacent to and conforming with the reference signal waveshape, said sensor signal being compared alternately with said reference signal control band limits to produce said output signal.

3. A solid state ballast for a gaseous discharge lamp comprising a single phase solid state chopper circuit for energization by low frequency alternating-current sinusoidal line voltage and electronically shaped line current and comprising rectifying means and high frequency filter means for supplying full wave rectified sinusoidal voltage to a pair of unidirectional voltage supply terminals, and further comprising controlled switching means and coasting device means effectively coupled to said unidirectional voltage supply terminals and to coasting inductor means and operated to be conductive alternately to supply load current through said coasting inductor means to a negative resistive characteristic gaseous discharge lamp, current sensor means coupled to sense the instantaneous load current and produce a sensor signal indicative thereof, and a control circuit comprising generating means for generating a reference signal in phase with the line voltage and having a preselected curved waveshape and magnitude to determine the power level and to effect shaping of the line current by means of shaping the load current to obtain a high line power factor exceeding 90 percent, comparing means for effectively comparing said sensor and reference signals and producing an output signal, and circuit means actuated by said output signal for operating said controlled switching means at a variable high frequency chopping rate to force and shape the line current as a result of forcing and shaping the load current as determined by the curved reference signal waveshape.

4. A solid state ballast according to claim 3 wherein said generating means in said control circuit comprises means for deriving a sinusoidal control voltage in phase with the line voltage and control function generator means for selectively electronically varying the magnitude and waveshape of said sinusoidal control voltage according to a predetermined control function to derive the curved reference signal waveshape, and said comparing means in said control circuit is comprised by a comparator circuit with hysteresis which derives a pair of control band limits closely adjacent to and conforming to the curved reference signal waveshape, said sensor signal being compared alternately with said reference signal control band limits to produce said output signal.

5. A solid state ballast for a gaseous discharge lamp comprising a single phase solid state chopper circuit for energization by low frequency alternating-current line voltage and electronically shaped line current and comprising full wave rectifying means and high frequency filter means for supplying rectified pulsating power voltage to a pair of unidirectional voltage supply terminals, and further comprising controlled switching means and coasting device means effectively coupled to said unidirectional voltage supply terminals and to coasting inductor means and operated to be conductive alternately to supply load current through said coasting inductor means to a gaseous discharge lamp, current sensor means coupled to sense the instantaneous load current and produce a sensor signal indicative thereof, and a control circuit comprising generating means for generating a reference signal in phase with the line voltage and having a preselected curved waveshape and magnitude to determine the power level and to effect shaping of the load current and therefore the line current to obtain a high line power factor exceeding 90 percent, comparing means for effectively comparing said sensor and reference signals and producing an output signal, and circuit means actuated by said output signal for operating said controlled switching means at a variable high frequency chopping rate to shape said load current as determined by the curved reference signal waveshape, wherein the alternating-current line voltage is sinusoidal, and said generating means in said control circuit is comprised by a transformer energized by the line voltage for deriving an approximately sinusoidal control voltage, and control function generator means for selectively electronically varying the magnitude and waveshape of said control voltage according to a predetermined control function to derive the curved reference signal waveshape, said control function generator means including a circuit for flattening said control voltage and an automatic gain control circuit so that the reference signal remains approximately constant despite variations in the line voltage.

6. A solid state ballast according to claim 5 wherein said controlled switching means is comprised by a power transistor, and said circuit means actuated by said output signal for operating said controlled switching means at a variable high frequency chopping rate is energized by said transformer and includes alternately operative positive and negative base drive circuits for respectively supplying variable base current for rendering said power transistor conductive and nonconductive.

* * * * *